L. A. WERNERY.
COMBINED TYPEWRITING AND COMPUTING MACHINE.
APPLICATION FILED JAN. 28, 1919.
1,389,232.
Patented Aug. 30, 1921.
7 SHEETS—SHEET 7.
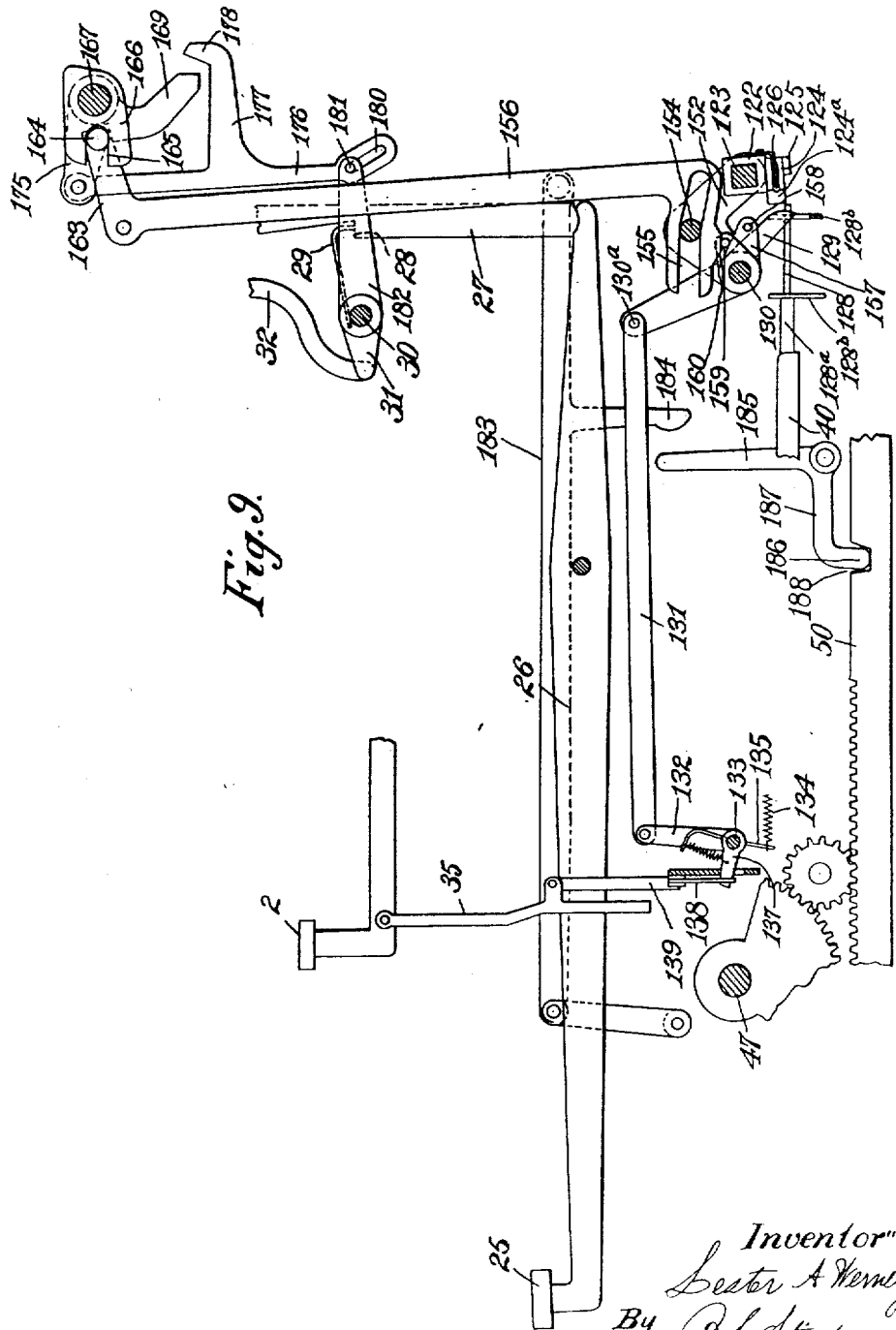

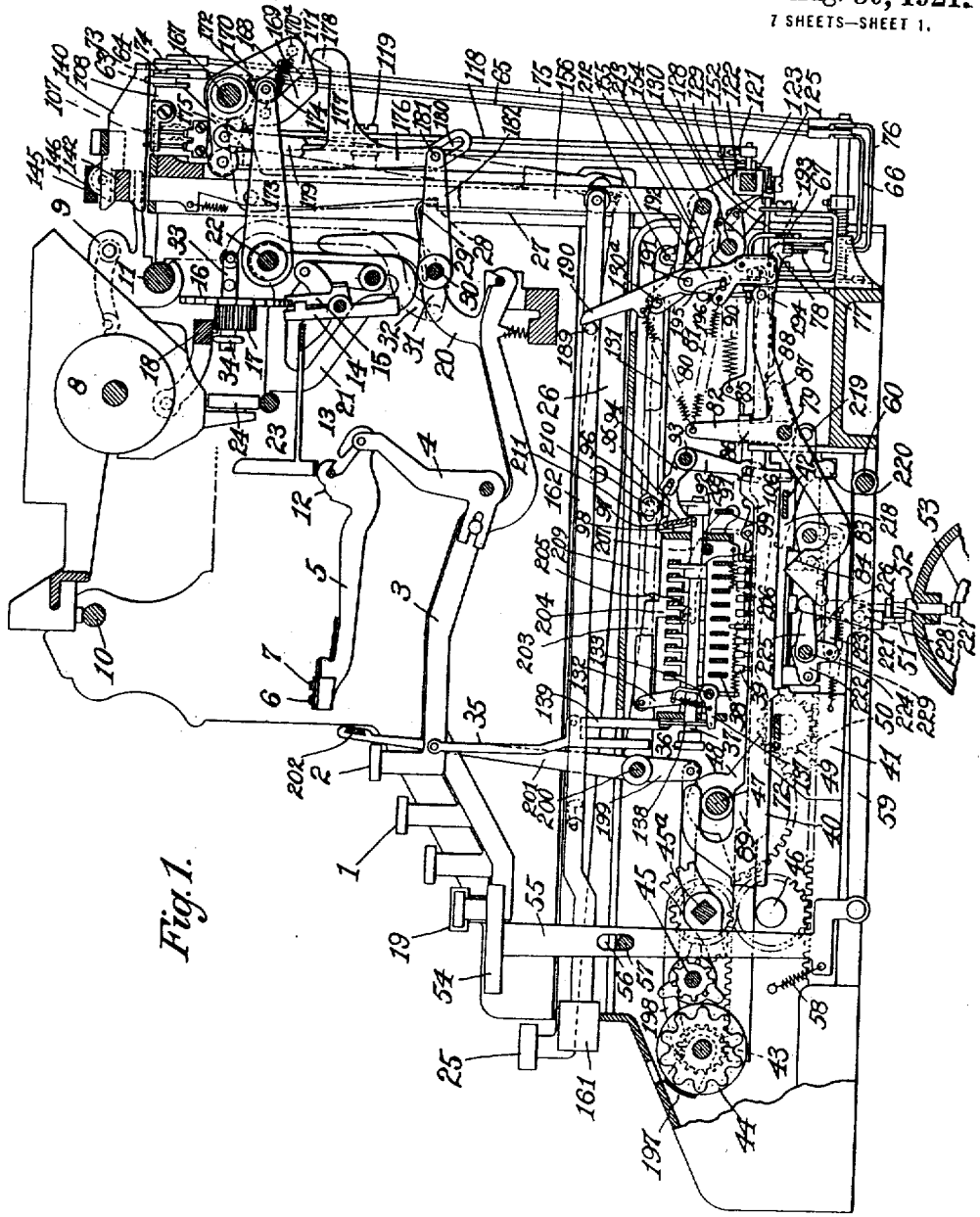

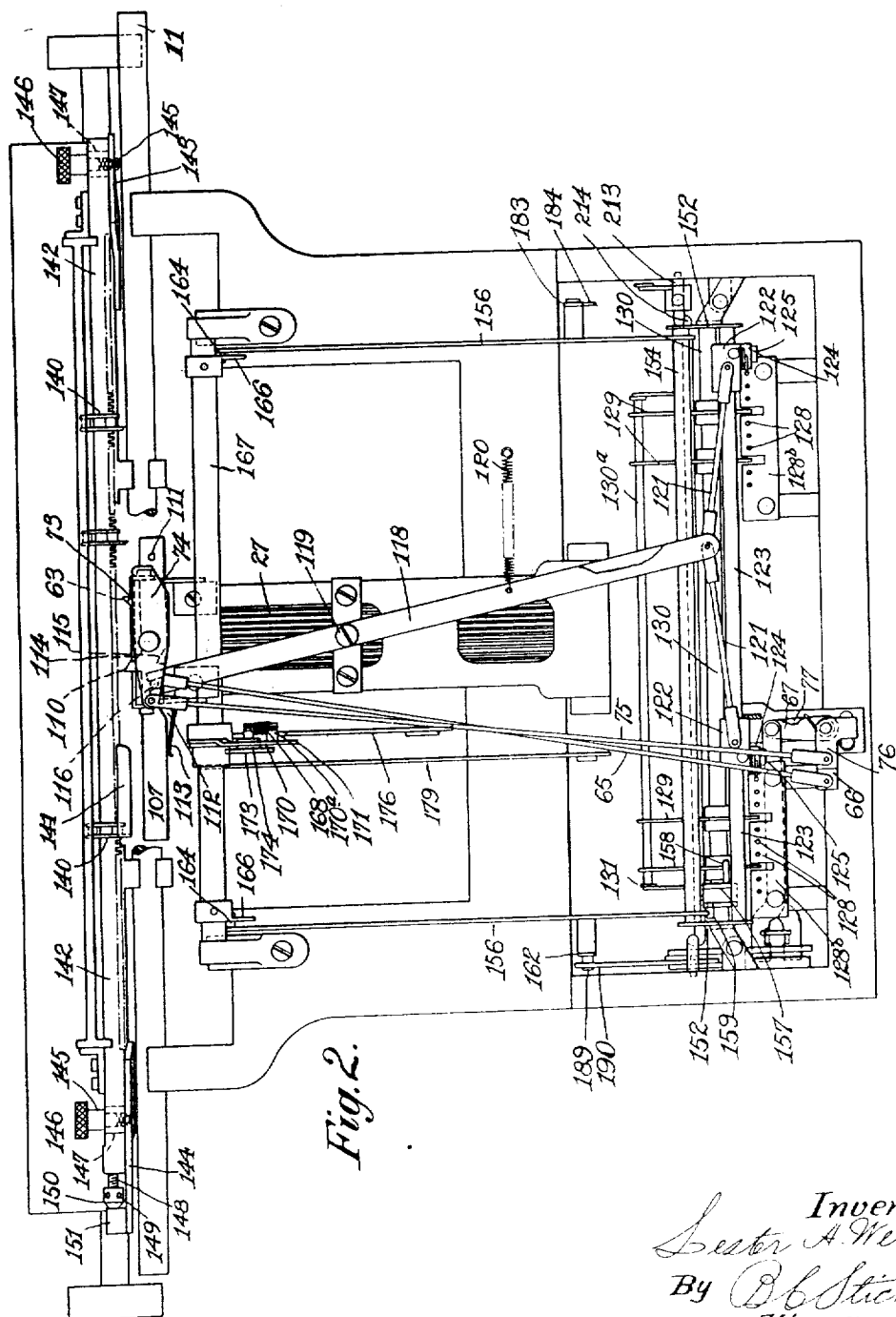

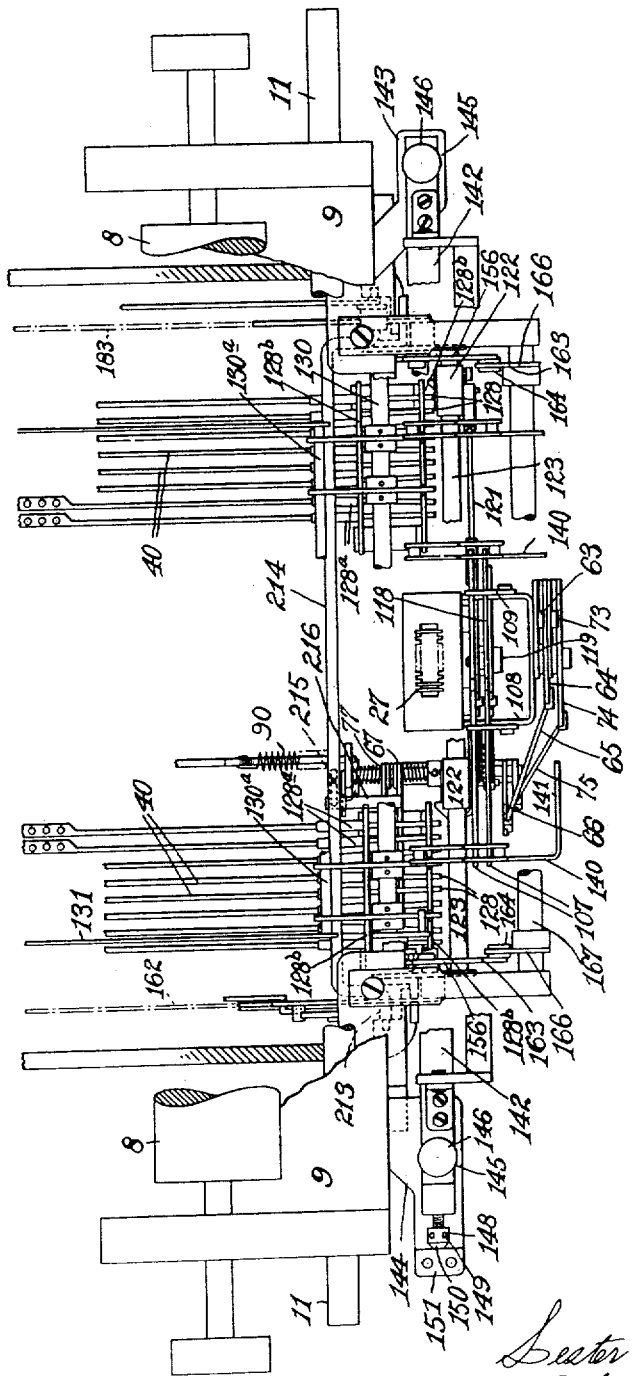

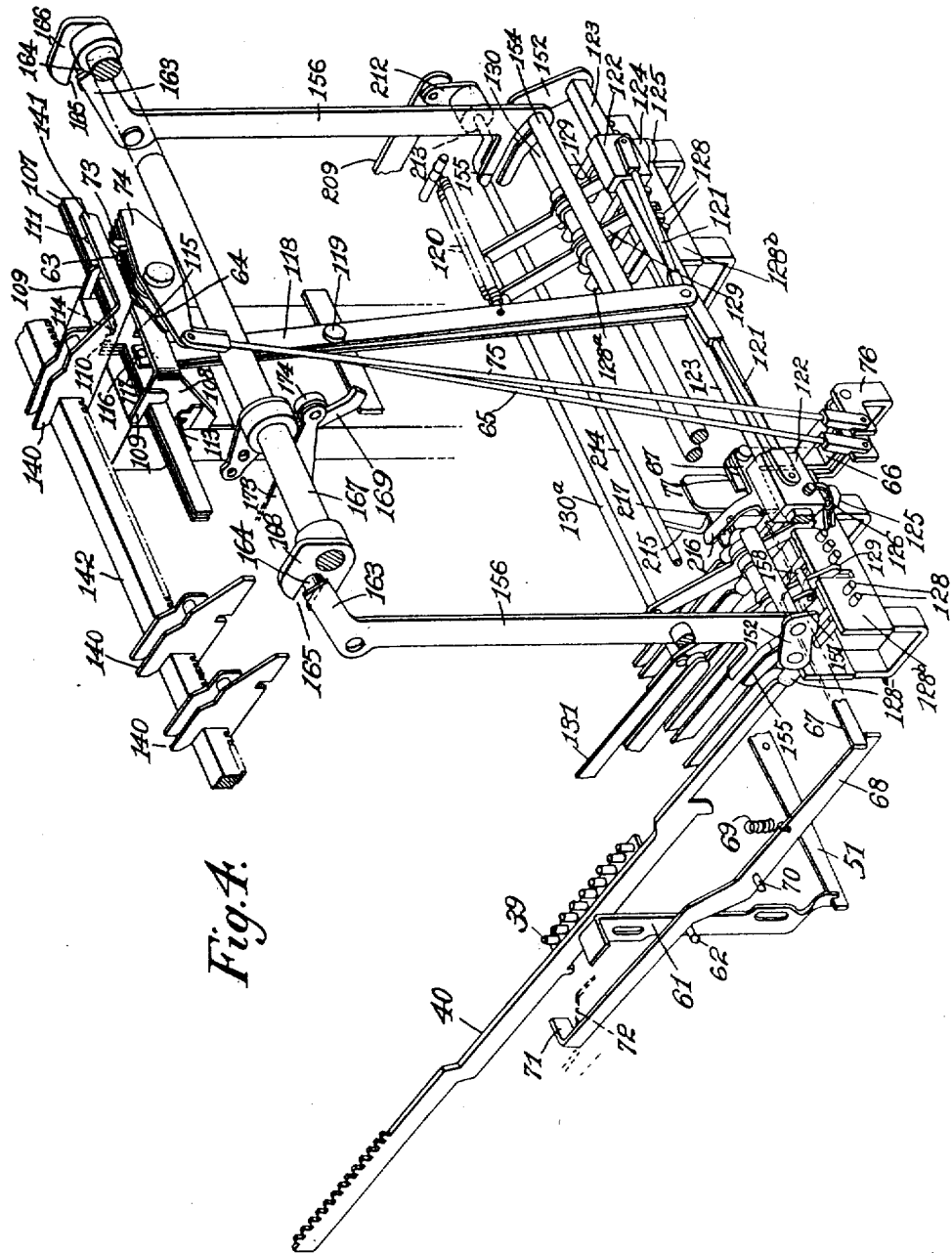

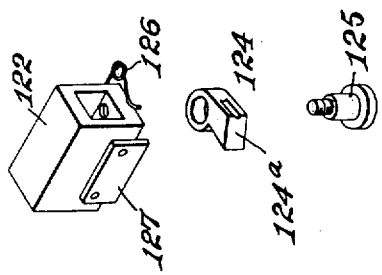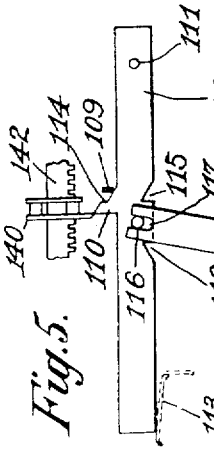

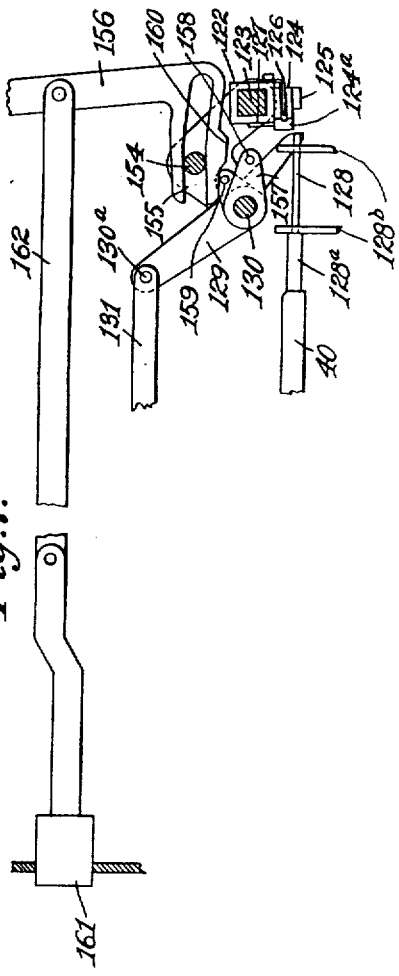
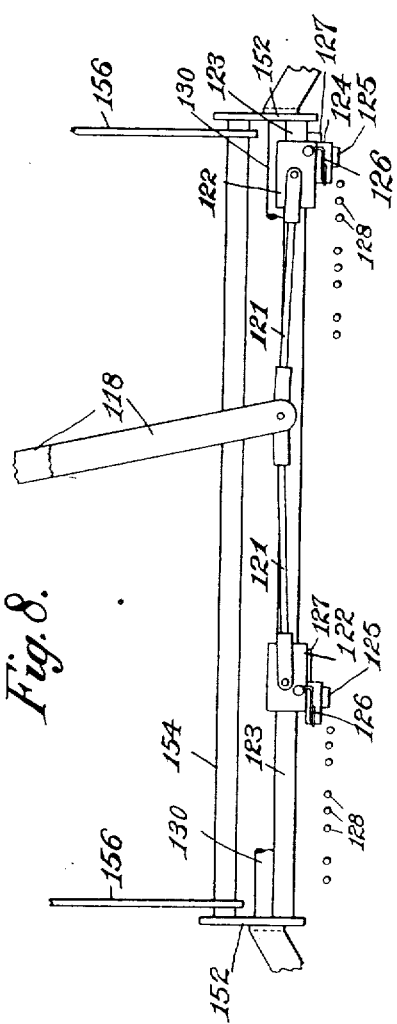

UNITED STATES PATENT OFFICE.

LESTER A. WERNERY, OF BROOKLYN, NEW YORK, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,389,232.    Specification of Letters Patent.    Patented Aug. 30, 1921.

Application filed January 28, 1919. Serial No. 273,609.

*To all whom it may concern:*

Be it known that I, LESTER A. WERNERY, a citizen of the United States, residing in Brooklyn borough, in the county of Kings, city and State of New York, have invented certain new and useful Improvements in Combined Typewriting and Computing Machines, of which the following is a specification.

This invention relates to computing machines, and more particularly to combined typewriting and computing machines, and is herein disclosed as applied to a machine of the Underwood-Hanson type. It should be understood, however, that certain features of the invention are capable of broader application.

In machines of the type referred to, index-pins on denominational members or rack bars are set up, by means of numeral keys, to afford a preliminary representation of a number to be computed, and, upon completion of such setting, a general operator is actuated to run up the number in the register.

The main object of my invention is to obtain an improved computing or combined typewriting and computing machine, in which the number of parts is decreased, the construction simplified, and the operation of certain parts improved, and one in which great flexibility in operation may be obtained, irrespective of the number of registers or totalizers used.

In the present invention provisions are made whereby the machine is adapted for rapid change for use with the different forms of work-sheets. To this end, provision is made of combined denomination-selector-actuators and tabulator stops, mounted on a single bar, which may also be used to control the subtraction-setting device and motor-trip, and means whereby the bar carrying the set-up in use may be readily removed and another bar with a different set-up be substituted therefor.

One feature resides in improved transposition means whereby the movement of the carriage in one direction effects movement of a selector-dog in the opposite direction, to engage the denomination members *seriatim*.

Another feature consists in the provision of means whereby a letter-space movement of the carriage causes a greater movement of the selector-dog. This arrangement causes the denominational members to be spaced apart at more than letter-space intervals, and enables the cam surfaces to be laid out to better advantage.

A further feature of the invention consists in improved means whereby computation may be effected in connection with numbers written in columns of less width than those corresponding to the capacity of the register.

Another feature of the invention consists in improved means whereby, when provision is made of a plurality of totalizers or registers, any desired number may be used as footing totalizers and the remainder as cross-adding totalizers.

A further feature of the invention resides in the combination of a punctuation lock with the improved denomination-selecting means.

Another feature resides in improved means whereby operation of either a tabulator key or the general operator will disable the denomination-selecting means; in other words, render it ineffective, and concomitantly lock the numeral keys; and operation of the case-shift key or non-compute key will disable the denomination-selecting means, but will not maintain the numeral-key lock in effective position.

A further feature resides in improved means for controlling a numeral-key guard and a register-shutter from the motor-trip device.

In the embodiment of the invention, herein disclosed, there is only one bar on the carriage, on which stops or controlling devices are set up, instead of the usual arrangement in which two distinct set-ups are required. The stops may serve as tabulator stops, and may also be used to actuate the denomination-selecting mechanism, the subtraction-trip and the motor-trip.

Also, no selector-dogs of the usual type are mounted on the carriage to move therewith, but provision is made of a selector-dog for each computing unit or register and of individual actuating devices for the dogs.

The stops, referred to above, are given different configurations to determine which selector-dogs shall be actuated, and, consequently, which registers shall be made effective. It should be noted that only one stop is effective at a time.

The use of only a single bar, at one time, on which set-ups are to be made, makes the machine particularly adaptable for use with different forms of work-sheets which are frequently changed. To enable the machine to lend itself more readily to this use, the means for securing the bar on the carriage are made readily releasable, and means for adjustment are provided to insure accurate positioning of a bar placed on the machine.

As many different bars may be provided as there are forms of work-sheets, and set-ups of stops are made to correspond to the requirements of the various work-sheets. After such set-ups have been made, the machine may be prepared for use by securing to the carriage the bar carrying the appropriate set-up.

The denomination-selecting means for each register is actuated by a stop on the set-up bar which travels with the carriage. This means comprises a slide adapted and supported to be engaged by a suitable stop, advanced with the carriage and released upon reaching a certain point. Such movement of the slide is utilized to actuate a lever, pivoted above its center, and also to actuate a selector-dog by means of a link connecting the lower end of the lever with a member on which the selector-dog is mounted.

The lever serves as a transposition device and takes the place of a large number of parts heretofore used.

The selector-dog acts, as is usually the case, to engage *seriatim* a plurality of denominational members to enable a setting of the usual index-pins. These members may be in the form of plungers in alinement with the respective rack bars, but it is evident that the plungers could be made integral with the respective rack bars, without substantially affecting the operation.

As a result of pivoting the transposition lever for each register at a point above its center, a letter-space movement of the carriage will effect a greater movement of the corresponding selector-dog and will necessitate spacing of the denominational members at corresponding intervals. This structure affords an opportunity to vary the selector-dog cam, and to provide a suitable dwell portion.

If two stops, adapted to actuate a slide, such as described, are spaced apart a distance less than that corresponding to the capacity of the register, the slide, upon release from the first stop, will be engaged by the second stop before it reaches its home position, and again advanced. Evidently, therefore, the machine is adapted for use in computing numbers written in columns narrower than those corresponding to the range of the register.

When the machine is equipped with a plurality of registers, provision is made, for each register, of a slide, a transposition lever, and a selector-dog. The transposition levers are mounted to move about the same axis, and the varying distances of the selector-dogs from said levers are provided for by suitably varying the lengths of the connecting links. With this construction it is evident that by use of stops of suitable configuration, any desired combination of registers may be made effective simultaneously. It follows that any of said registers may be used as footing registers, and that any of them may be made effective for cross-addition for any number of columns.

The levers for actuating the punctuation lock are located with their free ends between the ends of the denominational plungers, and are actuated by the dogs in traveling across the plungers. It will be seen that, due to the positions of said levers in the lower part of the machine, the number of parts has been very much decreased.

The selector-dogs are slidably mounted on a bar extending across the machine, and this arrangement lends itself to a construction in which the computing mechanism is disabled by moving the supporting bar so as to prevent engagement of the denominational members by the corresponding dogs. The bar is mounted, for this purpose, on arms pivoted to the machine frame.

To control the position of the selector-dog bar, use is made of the lower arms of the bell-cranks, which are ordinarily actuated by the non-compute key and the general operator for disabling the computing mechanism. To adapt said lower arms for this purpose, provision is made of offset portions having suitable cam-slots into which extend followers mounted on the bar-supporting arms. Rocking of the bell-cranks in the usual way will produce the desired result.

The punctuation lock is also controlled from one of said bell-cranks by means of a cam surface, on the lower side of the offset portion, having a central projection to actuate the lock and ineffective end portions to permit the lock to be released. Operative connection between the cam surface and the lock is afforded by means of a bell-crank lock having a pin on one arm underlying said cam surface and a pin on the other overlying the free end of one of the levers of the punctuation lock. Actuation of the bell-crank to bring the cam projection into action will actuate the punctuation lock, and an additional movement will cause the lock to be released.

Provision is made of suitable connections whereby operation of the tabulator keys or general operator will shift the bar and actuate the punctuation lock, and operation of the non-compute key or case-shift keys will give an additional movement, the computing mechanism being disabled and the punctuation lock being actuated and then released.

The shaft which controls the latching slide of the register-shutter and numeral-key-guard device, is in the form of a bail to prevent interference with the adjoining mechanism, and the rod portion of said bail is provided with a cam member, which is engaged and actuated at certain times by an arm extending laterally from the latch of the motor-trip device.

Other features and advantages will hereinafter appear.

In the accompanying drawings,

Figure 1 is a diagrammatic side elevation, partly in section, of the machine embodying this invention.

Fig. 2 is a rear view with parts omitted.

Fig. 3 is a plan view of the machine with parts broken away.

Fig. 4 is a fragmentary perspective view of the mechanism at the rear of the machine.

Fig. 5 is a detail view of the denominational selecting means for one register.

Fig. 6 is a perspective view of a slide-block, a denomination-dog, and a screw for securing the dog on the slide-block.

Fig. 7 is a view showing the positions assumed by various parts upon operation of the non-compute key.

Fig. 8 is a diagrammatic rear view showing the relative positions of the selecting dogs and plungers when the denomination-selecting means is silenced.

Fig. 9 is a diagrammatic side view showing the numeral keys locked and the denomination-selecting means silenced by operation of the tabulator key.

Upon depression of alphabet keys 1 and numeral keys 2, motion will be transmitted, through key-levers 3 and bell-cranks 4, to type-bars 5, carrying upper and lower-case types 6 and 7, respectively, to cause said type-bars to strike against the front platen 8, revolubly mounted in a shift-frame supported in a carriage 9, mounted for sliding movement on rods 10 and 11.

Upon approach of any type-bar 5 to the platen 8, a heel 12 on said type-bar will strike the front of the universal frame 13 and drive the same against the resistance of a spring (not shown), to actuate the usual fast and loose dogs 14 and 15, so that said dogs will alternately engage escapement wheel 16 and permit step-by-step feeding of the carriage under the urging of the usual spring barrel (not shown). Operative connection between escapement wheel 16 and carriage 9 is obtained by means of a pinion 17 connected to escapement wheel 16 and meshing with a rack 18, having the usual pivotal connections with carriage 9.

Provision is made of a shift-key 19, mounted on a lever having an upwardly-extending arm 20, which, upon depression of said shift-key, will engage frame 21, supported on a shaft 22, and rock the same to lift rod 23 and, consequently, the usual platen-shift frame, through engagement of rod 23 with roller 24.

In order to rapidly position the carriage, provision is made of decimal-tabulator keys 25 on levers 26, which underlie and are adapted to lift plungers 27 into engagement with suitable stops mounted to travel with the typewriter carriage. In order to release the carriage 9 from the escapement whenever a tabulator plunger is lifted, each of said plungers 27 is provided with a shoulder 28 for engagement with a universal arm 29 secured to a rock shaft 30. Consequently, depression of a tabulating key will rock said shaft 30, and, through arm 31, link 32, pivoted lever 33 and roller 34, lift rack 18 out of engagement with pinion 17. The carriage will thus be released from control by the escapement mechanism. The mechanism thus far described is well known in machines of this type.

In addition to actuating the corresponding type-bars 5, the numeral keys serve to set up computations which later are run into a register or registers. For this purpose, each of the numeral keys 2 has pivotally connected therewith a depending thrust-link 35, which is positioned to engage an arm 36 mounted on a rock shaft 37. It will be understood that there is one of such rock shafts for each of the numeral keys, and that each of said rock shafts has suitable operating connections with a pin-setting linkage, of which the lower bar 38 serves to engage and set pins 39. These settable pins 39 are arranged in longitudinal rows extending from front to back of the machine, and each of said rows is mounted on a denominational member shown in the form of a rack bar 40. Pins of the same number on the different bars 40 lie in rows transverse to the machine and slightly to the rear of the corresponding pin-setting bars 38. The rack bars 40 determine the denomination of pins set, and the setting bars 38 determine the value of the pins set on any of the said rack bars.

Said rack bars 40 are advanced *seriatim* by mechanism, hereinafter described, to enable setting of index-pins on the proper bars. After the pin-setting is completed, the general operator 41 will be actuated, and bars 40 will be advanced through the engagement of bar 42 of said general operator with the depressed pins, and will act through the usual pinion 43 to run up on dial wheels 44 the computation set up on pins 39. Certain elements of the carry-over mechanism are shown on shafts 45, 45ª and 46. The connection between the usual manually-operable shaft 47 and the general operator is obtained by gear-sectors 48, pinions 49 and racks 50 on the general operator.

The general operator may be driven by power, and the motor control may be similar to that shown in the patent to Minton, No. 1,280,065, dated September 24, 1918. Motor actuation of the general operator is obtained by rocking lever 51 to remove the stop-pin 52 from engagement with a clutch-closer 53, and thereby connect the general operator 41 with the motor to obtain a single back-and-forth movement of said general operator. Said lever 51 may be operated manually by means of a key 54 mounted on a stem 55 having a slot 56 through which a pin 57 extends. A spring 58 tends to hold said key 54 in its upper position. Pivoted to the lower end of stem 55 is a lever 59 mounted on a fixed pivot 60 and overlying said lever 51. Manual operation of lever 51 may also be effected by means of a plunger 61 mounted directly above lever 51 and provided with a pin 62, by means of which the automatic mechanism, now to be described, operates lever 51. The arrangement of the various parts is such as to make lever 51 one of the first class.

Whenever a stop, to be described hereinafter, comes into engagement with a one-way yielding dog 63 mounted on lever 64, said lever will be rocked, and will act through link 65 and bail 66 to withdraw the latch or locking member 67 from its obstructing position with reference to lever 68, and permit spring 69 to rock said lever 68 about its pivot 70 and act through pin 62 to depress plunger 61 and release the clutch. Said bail 66 has a spring associated therewith, which tends to return said bail to normal position. Lever 68 is provided with an offset portion 71, which will be engaged by a cam 72 on the general operator in its forward movement and lifted to return lever 68 to the control of latch 67.

The machine is also equipped with subtraction-setting means and an automatic control therefor, such, in general, as that disclosed in said Minton patent. Upon engagement by suitable stops, described hereinafter, with a one-way yielding dog 73, mounted on lever 74, link 75 will rock bail 76, against the action of its spring, and withdraw latch or lock 77 from obstructing position with respect to the rear arm 78 of a three-armed lever loosely mounted on shaft 79, and permit said lever to be rocked upon said shaft 79 by springs 80 and 81 attached to the upright arm 82 of said lever. The other arm 83 extends in a forward direction, and is provided with a cam head 84, with which the general operator coöperates to restore arm 78 to control by latch 77. The release of the three-armed lever by the withdrawal of latch 77 will cause a portion of upright arm 82 to engage a lug 85 on an arm 86 secured to said shaft 79, and effect a rocking movement thereof and withdraw hook 87 from a notch 88 of subtraction bar 89, and permit said subtraction bar to move to the rear under the influence of spring 90. The connection between arms 82 and 86 is such that shaft 79 may be rocked for subtraction-setting without movement of arm 82, and arm 82 after automatic subtraction-setting may be restored to normal position before the return movement of arm 86.

During the rearward movement of the bar 89, a pin 91 thereon actuates an arm 92, and such actuation is transmitted through shaft 93, arm 94 and arm 95 to rock a universal bar 96 about its pivot 97. Said bar 96 engages in notches 98 in shafts 37, and serves to shift said shafts 37 to the front, and thereby shift the connections between shafts 37 and the key-setting linkages, and at the same time render linkage 99 effective by means not shown. Concomitantly all of the "0" pins are depressed and the levers 106 associated therewith are shifted to place their rear ends in raised position. The mechanism herein referred to is fully described in said patent to Minton.

The denomination-selecting devices are actuated by engagement of suitable stops supported on the carriage with one or more pick-up bars 107 guided in slots in a fixed bracket 108 and held against upward movement out of said slots by members 109. The shape of the pick-up bars is clearly shown in Fig. 5. Each of said bars is provided, to the left of the center, with an upwardly extending projection or pick-up dog 110, which has its right edge (looking at the front of the machine) normal or perpendicular to the upper edge of said bar, to afford proper engagement with a selector dog moving to the left with the typewriter carriage, and has an inclined upper surface to enable camming down of said bars when engaged by stops in their movement to the right.

Movement of the bar 107 to the right is limited by engagement of a stop 111 thereon with bracket 108. A notch 112 in the lower edge of said bar is positioned over a supporting portion of bracket 108 when said bar is in home position and permits depression thereof. Provision is made of a spring 113, which normally supports said pick-up bars when in home position to enable engagement of projection 110 by stops traveling with the typewriter carriage. Upon such engagement, bar 107 will be moved to the left, until a cam 114 thereon engages the left member 109 and effects depression of the bar 107 and withdraws projection 110 from engagement with the traveling stop, said depression being rendered possible by the provision of a notch 115 in the lower edge of the bar.

Each bar 107 is provided with a pin 116 extending into a slot 117 of lever 118, mounted on a pivot pin 119 and urged by a spring 120 to hold bar 107 in home position. A link 121 pivoted to lever 118 and to a block 122 slidably mounted on a bar 123, enables lever 118 to control the position of said block, to which a selector dog 124 is secured by shoulder screws 125. Said dog 124 is provided with a cam face 124$^a$, and is yieldably supported on one side by spring 126 and rigidly supported on the other by plate 127.

Each block 122 is slidingly mounted on said bar 123, and the mounting is such that relative turning movement is prevented. To this end, bar 123 is rectangular in cross-section and passes through a corresponding opening in each of said blocks. The position of said bar may be varied by means to be described hereinafter, but its normal position is such that during a movement of each block from left to right, the cam face 124$^a$ will engage *seriatim* a series of bars or plungers 128 in alinement, respectively, with the series of rack bars 40, and thereby successively position said rack bars to enable pins to be set thereon. Said plungers are provided with enlarged heads 128$^a$, which furnish suitable means to engage the rack bars, and also serve to limit the rearward movement of said plungers. The use of plungers enables the use of a very simple supporting device comprising perforated plates 128$^b$, one of which is placed close to the rear ends of said plungers and gives suitable support against the lateral pressure exerted by the selector dogs. Inasmuch as there are as many plungers 128 as rack bars 40, and the same results would be obtained if plungers 128 and rack bars 40 were attached together, or even integral with each other, the plungers 128 may properly be referred to as denominational members.

As indicated in Figs. 2, 4 and 5, the lower arm of each lever 118 may be longer than the corresponding upper arm, whereby a letter-space movement of the carriage will cause a greater movement of each selector-dog, thus requiring plungers 128 to be spaced at intervals greater than letter-space intervals. Such spacing of the plungers manifestly makes it possible to give a less abrupt inclination to the cam face 124$^a$ on each selector-dog 124 than would be necessary otherwise, thus insuring a smooth and certain operation of these parts.

Provision is also made of a punctuation lock. Preferably, this lock comprises a number of levers 129 with their free ends positioned in proper intervals between plungers 128 for engagement by dogs 124 in their selecting movements. Said levers are loosely mounted on a shaft 130 and are held against longitudinal movement on said shaft by suitable means. At their upper ends, these levers are connected by a rod 130$^a$ connected at one end with a link 131, which is pivotally connected with an arm 132 fixed on shaft 133. Link 131 is normally drawn forward, and levers 129 are thereby held in normal position, by means of spring 134 connecting a pin 135, secured to said shaft, and a part of the machine frame. Shaft 133 is provided with a forwardly extending intruding member or arm 137, which, in the position shown in Fig. 9, coöperates with pivoted dogs 138 of a punctuation lock such as disclosed in the patent to Gumprecht 1,237,895, dated August 21, 1917, to prevent depression of the numeral keys. As shown in Fig. 9, the connection between arm 137 and shaft 133 is such as to permit yielding of arm 137 in case of obstruction by one of said dogs 138.

As is usual in devices of this type, intruding members 139 are pivotally supported on links 35 and the movement of said dogs 138 is limited, so that intrusion of one member 139 by depression of the corresponding numeral key will prevent intrusion of any other, and will therefore lock the other numeral keys. The intrusion of member 137 will effect locking of all of the numeral keys. Other means for rendering said punctuation lock effective will be described hereinafter.

Provision is made whereby the machine can be changed readily to adapt the same for use with the different work-sheets. To this end, provision is made of combined selector dogs and tabulating stops designated generally by 140, which will herein be referred to, in general, as stops. These stops are provided with means for operating the motor trip, and certain stops are provided with extensions 141 to effect subtraction-setting. Furthermore, the configuration of the stops is varied to determine which bars 107 are to be picked up and thereby render the corresponding computing units effective. The rack bar 142, on which these stops are positioned, is attached to brackets 143, 144 extending rearwardly from the typewriter carriage, by means permitting ready application and removal of said bars. This arrangement enables set-ups of stops to be made on a plurality of rack bars in accordance with the requirement for different work-sheets, and, when a change in work-sheets is to be made, all that is necessary for preparation is to remove the bar in use and replace the same by the bar carrying the desired set-up.

It should be understood that there are as many selector-dogs 140 as there are columns to be computed, and that where a totalizer is to be used for columnar computation in a certain column only, every selector-dog but the one corresponding to said column will be cut away or notched, so as not to engage the projection 110 of the pick-up bar corresponding to that totalizer. Manifestly the pick-up bar of a cross-totalizer must be actuated by each selector-dog.

Preferably, shoulder screws 145 having knurled heads 146 are passed through slots 147 in said rack bars and engage in threaded openings in brackets 143 and 144. Said slots 147 permit longitudinal engagement of bar 142, and, by tightening screws 145, bar 142 will be clamped between the supporting brackets and shoulders on said screws. Obviously, screws 145 can readily be removed, a bar 142 removed, and another bar placed on the brackets. As the different rack bars and the various machines in which they are to be used may have some variation in the relative positioning of the parts, it is desirable to provide means whereby an adjustment may be made to insure proper positioning of the rack bar. Each bar 142 is therefore provided with an adjusting screw 148 inserted in one end thereof, and, when the bar is placed in the machine for the first time, said screw 148 is adjusted by means of a pin inserted in holes 149 in an enlarged head 150, said head 150 normally abutting against a block 151 on bracket 144. In subsequent use of the bar for which the adjustment has been made, proper longitudinal positioning of said bar will be insured by placing head 150 of the screw in contact with block 151.

To enable the denominational selecting means to be silenced or rendered ineffective, bar or guide 123 is supported on arms 152 loosely mounted on shaft or rod 130. Said arms 152 are connected by a rod 154, the ends of which are utilized as cam followers. Each of said arms 152 is bent into elbow shape to prevent interference with adjoining parts. Cam slots 155 to receive said followers are provided at the ends of the downwardly extending arms of bell cranks 156, pivotally mounted on opposite sides of the machine, and said cam slots are so shaped that movement of said bell cranks from normal position will shift guide 123 and render selector dogs 124 ineffective. In order to accommodate cam slots 155, the ends of the downwardly extending arms of said bell cranks 156 are provided with lateral extensions.

Bell crank 156 at the right is utilized to control the punctuation lock, and such control is obtained by means of a bell crank 157, having a pin 158 on one arm overlying a lever 129 of the punctuation lock, and a pin 159 on the other underlying the offset portion of the downwardly extending arm of the bell crank 157 to the right of the machine. The surface of the offset portion engaging with pin 159 is provided with a central cam projection 160, which, when brought into engagement with pin 159, will rock bell crank 157 and operate the punctuation lock. It will be seen that further movement of the bell crank 156 will cause release of bell crank 157 and consequently release the punctuation lock.

The bell crank 156 is controlled from several different sources, one of which is the non-compute key 161, which serves to operate a link 162 pivotally connected to one of said bell cranks 156. Rearwardly extending arms 163 of bell cranks 156 are provided with followers 164, which engage in slots 165 of arms 166 fixed on rock shaft 167. These connections cause bell cranks 156 to move in unison and enable actuation of the shaft 167 from either of said bell cranks 156 or actuation of the bell cranks from shaft 167.

Other connections with the shaft 167, which are substantially the same as those disclosed in the patent to Gumprecht 1,268,565, dated June 4, 1918, will now be described. Bell cranks 156 are normally held in the position shown in Fig. 1, by means of a spring 168 secured at one end to an arm 169 fixed on rock shaft 167, and at the other to a pin 170ª on an arm 170 loose on rock shaft 167. Arm 170 is provided with a stop projection 171, which limits the approach of arm 169 and arm 170 to each other, and in effect serves to provide a cam slot between these arms, due to the hump 172 on arm 170 and the corresponding concavity of arm 169. Fixed on shaft 22 of the case-shift frame is an arm 173 carrying at its free end a roller 174, which lies between said arms 169 and 170 and normally at the upper part of the opening therebetween. It will be understood that arm 173 and roller 174 thereon serve normally to maintain arm 170 in the position shown in Fig. 1, and enable spring 168 to be effective to urge shaft 167 in a counter-clockwise direction.

Extending forwardly from shaft 167 is an arm 175, to which is pivoted a link 176, carrying a rearwardly extending arm 177 provided with a stop 178 for engagement with pin 170ª. Also pivoted to arm 175 is a link 179 connected to a back spacer (not shown). At its lower end, link 176 is provided with an inclined slot 180, into which projects a pin 181 on an arm 182 fixed to shaft 30, which is actuated by the tabulator plungers 27.

It will be seen that depression of said non-compute key 161 will effect movement of bell cranks 156 to the position shown in Fig. 7 and rock shaft 167. As a result of the rocking of shaft 167, link 176 will be lifted and swung forwardly, due to the guiding action of pin 181, which remains stationary. Said movement of link 176 will serve to place stop 178 in position to engage pin 170ᵃ, and thereby cause the release of arm 173 and consequently of the case-shift mechanism during the period of depression of said non-compute key 161. With the parts in this position, stop 178 may play the part usually taken by arm 173, namely, that of supporting arm 170 to enable spring 168 to be effective for urging shaft 167 to normal position.

It will also be seen that actuation of tabulator key 25 will effect rocking of shaft 30, and through arm 182, pin 181 and link 176, actuate arm 175 and consequently shaft 167. With this actuation, also, stop 178 will be positioned to engage pin 170ᵃ.

Upon depression of case-shift key 19, shaft 22 will be rocked, and roller 174 will exert a camming action on arm 169, which through various connections, will position bell cranks 156, as shown in Fig. 9. It will be evident that this movement is not in opposition to spring 168, for arm 170 will no longer be supported by arm 173, and the arrangement of the parts is such that pin 170ᵃ will not be engaged by stop 178. During return of the case-shift key to normal position, camming action will be effected between roller 174 and hump 172 in order to restore shaft 167 to its normal position.

Provision is also made of means to disable the denomination-selecting means and to lock the numeral keys during the operation of the general operator. This means comprises a link 183, pivotally connected with bell crank 156 at the left of the machine, and having a downwardly extending arm 184 integral therewith. Provision is also made of a pivoted bell crank 185, normally having its upper end in contact with arm 184, and having a projection 186 on its lower arm 187 engaging in a notch 188 of the adjacent rack bar 50 of the general operator. Upon actuation of the general operator, the projection 186 will ride out of notch 188, and, through the intermediate parts just referred to, will rock bell cranks 156 to the position shown in Fig. 9, thus disabling the denominational selecting means and locking the numeral keys. This mechanism is in general the same as that disclosed in said patent to Gumprecht, 1,237,895.

Whenever bell cranks 156 are swung to disable the denominational selecting means, a pin 189 on link 162 acts to swing a lever 190 about its pivot 191 against the action of spring 80, and to allow a plate 192 to be drawn forward by spring 81, to cause a latch 193 on said plate 192 to engage a pin 194 on arm 78 and prevent automatic release of subtraction bar 89 when the computing mechanism is disabled. Connection between lever 190 and plate 192, both mounted on the same pivot 191, is obtained by a pin 194 on lever 190 engaging in a slot 196 in plate 192.

The arrangement of the various parts is such that spring 80 normally overpowers spring 81 and holds the upper end of lever 190 in forward position. The control of plate 192 is such that operation of lever 190 will be possible, even if pin 194 obstructs latch 193. This mechanism is substantially that shown in said Minton Patent 1,280,065.

Provision is also made for automatic covering of the numeral keys and the totalizer or totalizers as soon as the indexing of a bar is completed. A pivotally supported register shutter 197 is connected by a link 198 to an arm 199 fixed on shaft 200, which also has fixed thereon arms 201, carrying a numeral-key-obstructing bar or guard 202. Also fixed on shaft 200 is an arm 203 having a downwardly turned end 204, provided with an upwardly facing shoulder 205 at the rear thereof. The arm 203 is urged upwardly to move shutter 197 and guard 202 to effective position by a spring 206 acting through lever 207 mounted on shaft 208, and provided at its forward end with a yoke embracing a pin on the downwardly turned end 204 of arm 203. Said arm 203 is normally held depressed by a latch 209, coöperating with said shoulder 205 and supported for sliding movement on pin 210, passing through a slot 211 therein. At its rear end said latch 209 is pivotally connected with an arm 212 mounted on a shaft 213. Up to this point, this device is in general the same as that disclosed in the patent to Hart, No. 1,237,899, dated August 21, 1917.

In order to avoid interference with bell cranks 156 and with the mechanism carried by shaft 130, shaft 213 is shaped like a bail, having a rod 214 extending across the machine. Said rod 214 has a downwardly extending cam arm 215, which, upon actuation of the motor trip, is engaged and actuated by an arm 216 carried by latch 67 forming part of the motor trip device. Support for arm 216 in its actuating movement is provided by a guide member 217. As in said Hart patent, arm 203 is turned to position to be engaged by latch 209 by means of a lever 218 thrown upwardly against the rear end of lever 207 upon operation of the general operator. Said lever 218 is pivoted at 219, and has a projection 220 normally lying in a notch in one of the general-operator rack bars, but which will be forced out of said notch upon actuation of the general operator.

During the return movement of the general operator, all of the depressed index pins are restored to normal position and the machine is in condition for a new indexing operation. The pins are lifted by means of a universal restoring plate 221, supported on bell cranks 222, connected to move together by means of a link 223. On the forward supporting shaft 224 is fixed an arm 225, which engages a member on the lower side of plate 221 and serves to lift the same when shaft 224 is rocked. Secured to shaft 224 is an actuating arm 226, which is lifted on the return movement of the general operator by means of a cam dog 227, pivoted at 228 on the general operator and normally held in its limiting position, shown in Fig. 1, by a spring 229, which, during the forward movement of the general operator, yields and enables dog 227 to be swung back and down sufficiently to ride under arm 226.

In the ordinary operation of the machine, each bar 107, after being released from the stop 140 as the latter passed out of the computing zone, is carried to its right-hand limiting position and the corresponding selector-dog 124 is carried to the left just beyond the plunger 128 of highest denomination. If, therefore, numbers, of small denomination only, are to be computed in the next column a considerable space will necessarily remain between the two columns of figures. In the present structure this condition can be avoided by positioning the second stop 140, so as to be engaged by the dog 110 in its return movement, thus reconnecting the dog 110 with the typewriter carriage. The second stop may be positioned so that the selector-dog 124, corresponding to the pick-up dog 110, will move to the left past the plunger corresponding to the highest denomination to be written in the narrow column. Also by properly positioning the second stop, the interval between the two columns may be determined. In the uusal type of pick-up mechanism, in which a pivoted bar is spring-pressed toward a stop on the carriage, such pick-up of the bar by the stop on the typewriter carriage will be uncertain. In the present structure, however, each bar 107 is rigidly supported by bracket 108 except when in its limiting position, whereby operative engagement between the pick-up dog 110 and second stop 140 is assured. Columns of any width, not exceeding the range of the totalizer, may thus be typewritten and computed, the intervals between the columns being made as small as desired. It will be seen that the totalizer in which such computations are effected serves as a cross-totalizer.

Variations may be resorted to within the scope of the invention, and portions of the improvements may be used without others.

Having thus described my invention, I claim:

1. In a computing machine, the combination with a traveling carriage and a series of reciprocable bars, of transposition mechanism comprising a cam member mounted for movement in a path parallel to that of the carriage to successively engage said bars, said cam member being so shaped that in its movement, in a direction reverse to that of the carriage, into alinement with one of said bars, it will cam the same into effective position, and carriage-actuated means for moving said cam member in such reverse direction.

2. In a computing machine, the combination with a traveling carriage and a series of movable bars, of a cam member, and carriage-actuated means for moving said cam member in a direction reverse to that of the carriage, and thereby effecting successive engagement and actuation of said movable bars by said cam member.

3. In a computing machine, the combination with a traveling carriage, a series of bars mounted for movement in parallel planes and a series of bar-positioning plungers, of transposition mechanism comprising a cam member, and carriage-actuated means for moving said cam member, in a direction opposite to that of the carriage movement, into successive engagement with said plungers.

4. In a computing machine, the combination with a traveling carriage and a series of reciprocable bars, of transposition mechanism comprising a member movable transversely of said bars into engagement therewith successively, the engaging surfaces of said member and each of said bars being such that said member will effect movement of a bar upon such engagement therewith, and carriage-actuated means for moving said member in a direction opposite to that of said carriage.

5. In a computing machine, the combination with a traveling carriage, of a plurality of members mounted for movement in parallel planes, a series of settable index-pins on each of said members, numeral-key-actuated devices for setting said pins, the normal position of said members being such that the series of index-pins thereon will be out of position to be engaged by said setting devices, a series of interponents, a cam, and carriage-actuated means for moving said cam in a direction reverse to that of the carriage, and thereby effecting successive engagement with said interponents to position said members to bring the settable index-pins thereon into operative position with respect to said setting devices.

6. In a computing machine, the combination with a plurality of denominational members mounted for movement in parallel planes, a series of settable index-devices on each of said members, and numeral-key-actuated devices for setting said index-devices, the normal position of such denominational members being such that the index-devices thereon are out of operative position with respect to said setting devices, of a series of plungers in engagement with said denominational members, a cam member, and means to move said cam member transversely of said plungers to effect successive engagement therewith, and thereby bring the sets of index-devices on said denominational members successively into operative relation with said setting devices.

7. In a computing machine, the combination with a traveling carriage, of a plurality of movable members carrying computing devices, key-driven mechanism for operating said computing devices, the normal position of each of said movable members being such as to prevent operation of the computing devices thereon by said key-driven mechanism, a series of plungers engaging said members, a cam, and carriage-driven means to move said cam transversely of said plungers to effect successive engagement therewith, and thereby bring the computing devices on each of said members into operative relation with respect to said key-driven mechanism.

8. In a computing machine, the combination with a traveling carriage and a series of movable bars, of a cam member, carriage-actuated means for moving said cam member in a direction reverse to that of the carriage movement, and thereby effecting successive engagement of said movable bars by said cam member, and means for preventing such engagement.

9. In a computing machine, the combination with a traveling carriage and a series of reciprocable bars, of a cam, a transverse bar on which said cam is slidably mounted, carriage-actuated means for moving said cam in a direction opposite to that of the carriage movement, mechanism normally holding said bar in position to enable said cam to engage said reciprocable bars, and means to actuate said mechanism to withdraw said transverse bar from said reciprocable bars to prevent engagement of the cam therewith.

10. The combination with typewriting mechanism including a traveling carriage, of computing means comprising a series of reciprocable bars, each carrying a set of index-devices, a series of interponents for actuating said reciprocable bars, a selecting dog, and carriage-actuated means for driving said dog in a direction opposite to that of the carriage, and causing successive engagement of said interponents by said dog, said dog being provided with a cam to effect forward movement of each of said interponents upon engagement therewith.

11. In a computing machine, the combination with a plurality of reciprocable bars having index-devices thereon, a plurality of plungers to engage said bars, means for setting said devices, and a general operator, of means for severally positioning said bars to enable setting of said index-devices by said setting means comprising a guide extending transversely of the machine, a dog slidably mounted on said guide for traveling movement thereon, means whereby engagement of said plungers by said dog will effect operative positioning of said reciprocable bars with reference to said setting means, and means to move said guide so as to prevent engagement between said plungers and said traveling dog.

12. In a computing machine, the combination with a register, of operating means therefor including numeral keys, a plurality of driving bars, a general operator having connections for motor operation, and a motor-trip device including a latch, a register-shutter, a numeral-key guard, and means rendered effective by said latch for moving said shutter and said guard to their effective positions.

13. In a computing machine, the combination with a register, of operating mechanism therefor including numeral keys, a plurality of driving bars, a general operator having connections for motor operation, and a motor-trip device, a register-shutter, a numeral-key guard, means tending normally to render said shutter and said guard effective, a latch for preventing operation of said means, a rocking device connected to said latch, a cam carried by said rocking device, and a member driven by said motor-trip device to engage said cam and thereby rock said rocking device to render said latch ineffective.

14. The combination with computing mechanism including a register, operating means therefor comprising numeral keys, and a general operator having connections for motor operation, of a motor-trip device, a register-shutter, a numeral-key guard, means tending to move said shutter and guard to effective positions, means to restrain said shutter and guard from movement to effective position, a bail connected with said restraining means, a cam member carried by said bail, and a motor-trip member for engaging said cam member to rock said bail.

15. The combination with computing mechanism including a register and operating means therefor comprising numeral keys and a general operator having connections for motor operation, of a motor-trip device, a register-shutter, a numeral-key guard, means tending to move said shutter and guard to effective position, means to restrain said shutter and guard from movement to effective position, a bail connected with said restraining means, a motor-trip-actuated member, and cam means whereby said motor-trip-actuated member will effect rocking of said bail.

16. The combination with computing mechanism including a register and operating means therefor comprising numeral keys and a general operator having connections for motor operation, of a motor-trip device, a register-shutter and a numeral-key guard connected for simultaneous movement to and from effective positions, urging means tending to move said shutter and guard to effective position, means including a locking member to prevent such movement, a bail connected with said locking member, a cam member carried by the offset portion of said bail, and a motor-trip-actuated member for engaging said cam member to rock said bail.

17. The combination with computing mechanism including numeral keys, a register, and register-driving means, of a motor-trip device including a locking member, a device for obscuring said register and guarding said numeral keys, means tending to move said obscuring and guarding device to effective position, a latch member adapted to coöperate with said obscuring and guarding device to prevent movement of the same to effective position, a shaft connected with said latch member, and cam connections between said shaft and said locking member, whereby movement of said locking member to ineffective position will effect a rocking movement of said shaft to cause withdrawal of said latch member from effective position.

18. In a combined typewriting and computing machine, the combination with tabulating mechanism, subtraction-setting mechanism, a motor-trip connection and transposition mechanism, of a traveling carriage, a series of stops for coöperating with said mechanisms, and a bar, on which said stops are secured, removably mounted on said carriage, said bar being one of a set of interchangeable bars having stops thereon positioned to conform to the requirements for different forms of work-sheets.

19. In a combined typewriting and computing machine, the combination with tabulating mechanism, subtraction-setting mechanism, motor-trip mechanism, and denomination-selecting mechanism, of a carriage, a series of stops for coöperating with said mechanisms, and a bar, on which said stops are secured, releasably secured to said carriage.

20. In a combined typewriting and computing machine, the combination with tabulating mechanism, subtraction-setting mechanism and denomination-selecting mechanism, of a carriage, a series of stops for coöperating with said mechanisms, and a bar, on which said stops are secured, removably mounted on said carriage, said bar being one of a set of interchangeable bars having stops thereon positioned to conform to the requirements of different forms of work-sheets.

21. In a combined typewriting and computing machine, the combination with tabulating mechanism and denomination-selecting mechanism, of a traveling carriage, a series of stops coöperating with said mechanisms, and a bar, on which said stops are secured, removably mounted on said carriage, said bar being one of a set of interchangeable bars having stops thereon positioned to conform to the requirements for different forms of work-sheets.

22. In a combined typewriting and computing machine, the combination with a tabulating mechanism and denomination-selecting mechanism, of a traveling carriage, a series of stops for coöperating with said mechanisms, a bar on which said stops are supported, said bar being one of a set of interchangeable bars with stops selected and arranged to conform to the requirements for different work-sheets, and manually releasable means for guiding said bar for longitudinal movement on said carriage and for clamping the bar thereto.

23. In a combined typewriting and computing machine, the combination with tabulating mechanism and denomination-selecting mechanism, of a traveling carriage, a bar carrying stops to coöperate with said mechanisms, said bar being one of an interchangeable set having different arrangements of stops, means to guide said bar for longitudinal movement on said carriage and to secure said bar thereto, and means for readily giving said bars the proper position on said carriage comprising a member adjustably carried by each of said bars at one end thereof, and a stop on said carriage with which said member coöperates.

24. In a combined typewriting and computing machine, the combination with a traveling carriage, a bar removably secured to said carriage and stops adjustably positioned on said bar, of tabulating mechanism, subtraction-setting mechanism, motor-trip mechanism, and transposition mechanism including a pick-up device for engagement by certain of said stops, said tabulating mechanism, subtraction-setting mechanism and motor-trip mechanism coöperating with certain stops on said bar.

25. In a combined typewriting and computing machine, the combination with a traveling carriage, a bar releasably secured to said carriage and stops adjustably positioned on said bar, of tabulating mechanism, subtraction-setting mechanism, motor-trip mechanism, transposition mechanism, and means to render said transposition mechanism ineffective, said tabulating mechanism, subtraction-setting mechanism and motor-trip mechanism coöperating with certain stops on said bar.

26. In a combined typewriting and computing machine, the combination with a traveling carriage, a bar removably secured to said carriage and stops adjustably positioned on said bar, of tabulating mechanism including tabulator-keys, subtraction-setting mechanism, a motor-trip mechanism and transposition mechanism, said tabulating mechanism, subtraction-setting mechanism, motor-trip mechanism and transposition mechanism coöperating with the stops on said bar, and tabulator-key-actuated means for rendering the transposition mechanism ineffective.

27. In a combined typewriting and computing machine, the combination with typewriting mechanism including numeral keys and a traveling carriage, of a bar removably secured to said carriage, stops adjustably positioned on said bar, tabulating mechanism including tabulator-keys, subtraction-setting mechanism motor-trip mechanism, transposition mechanism, all of said mechanisms coöperating with stops on said bar, and tabulator-key-actuated means for rendering said transposition mechanism ineffective, and for locking said numeral keys.

28. In a computing machine, the combination with typewriting mechanism including numeral keys and a traveling platen, and computing mechanism including a register, denominational members corresponding in number to the capacity of the register and a general operator for actuating said denominational members, of means to enable computation of numbers printed in columns of smaller capacity than that of said register, said means comprising a series of stops connected to said platen to travel therewith, certain of said stops being spaced at intervals less in extent than the one corresponding to the capacity of the register, a pick-up device positioned for successive engagement by said stops, a denomination-selecting dog, and connections whereby said pick-up device, when engaged by any of said stops, will effect a traveling movement of said dog in a direction opposite to that of the carriage.

29. In a computing machine, the combination with a traveling carriage having a step-by-step movement, of a register, denominational bars for driving said register, a set of index-devices on each of said denominational bars, numeral-key-actuated devices for setting said index-devices, means, including a selecting dog supported for movement transverse to said denominational bars, for operatively positioning the same with respect to said setting devices, and means to effect movement of said selecting dog corresponding to numbers having a smaller range than that of the register, comprising a stop-carrying bar connected to said carriage to move therewith, stops, certain of said stops being spaced at intervals less than that corresponding to the range of the register, means including a pick-up bar to actuate said selecting dog, a projection on said pick-up bar normally in the path of the stops, means for releasing said pick-up bar from a stop at the end of a selecting movement, and means tending to return said pick-up bar to its normal position.

30. In a combined typewriting and computing machine, the combination with typewriting mechanism including numeral keys and a traveling platen, a register, numeral-key-controlled preliminary representation devices and a general operator, of means for effecting computation of numbers printed in successive columns of smaller range than that of the register, said means comprising a series of stops adjustably mounted on a bar connected to said platen to travel therewith, a pick-up device positioned for successive engagement by said stops, a denomination-selecting dog, and connections whereby said pick-up device, when engaged by any of said stops, will effect a traveling movement of said denomination-selecting dog in a direction opposite to that of the platen.

31. In a computing machine, the combination with a traveling bar and stops positioned thereon, of a pick-up bar having a projection on the upper side thereof, one side of said projection being normal to the upper edge of said bar, and the other side being inclined to said upper edge, a second inclined portion extending downward on the same side of the projection as the first inclined portion, said bar being provided with a notch at its lower edge forming a surface parallel to said last-mentioned inclined portion, a support for the forward end of said pick-up bar providing a slot for guiding said bar, a spring underlying the other end of said pick-up bar, a fixed member overlying said bar adjacent said spring, and a stop on said bar to engage with said slotted support and to limit the movement of said pick-up bar in one direction.

32. In a computing machine, the combination with a traveling member having stops thereon, of a pick-up bar having a projection with one side adapted for driving engagement by said stops and with an inclined end forming a cam surface to be engaged by said stops when moving in one direction, a cam on said pick-up bar having the same general inclination as said cam surface, said bar being provided with two notches on the edge opposite the projection, yielding means urging said bar to a limiting position in one direction, a guide on the same side of said bar as said notches and opposite the first notch when said bar is in home position, yielding means to support said bar when in home position, a second guide on the same side of said bar as said cam and positioned to be engaged thereby at the end of the driving movement of said bar to effect depression thereof, and a third guide positioned so that the second notch will be opposite the same when said cam is engaged by said second guide.

33. In a computing machine, the combination with a traveling element having stops thereon, of a pick-up dog having one face adapted to have a driving engagement with said stops in the normal travel of said element, and another face to have a camming action with any of said stops during their return movement, means for normally supporting said pick-up dog for movement in a direction parallel to that of said traveling element and permitting depression of said dog when at the limit of its movement in either direction, including a bar carrying said dog, and means including a cam on said bar for depressing the bar and consequently the dog at the end of their forward movement, depression of the other end of said bar at the limit of movement in the other direction being effected by engagement of a stop with the face of said pick-up dog, which is adapted to have a camming action with such stops.

34. In a computing machine, the combination with a traveling bar and stops positioned thereon, of a pick-up device comprising a pick-up bar having a projection normally in the path of said stops, said projection having an inclined end whereby a stop traveling in one direction will have a driving engagement therewith, and in the opposite direction will tend to depress said pick-up bar, said pick-up bar being provided with a cam adjacent the short side of said projection and a corresponding notch on the opposite side of said pick-up bar and a second notch on the same side of said bar as the first but on the other side of said projection, and rigid guiding members above and below said pick-up bar at each end, movement in one direction bringing said cam against one of said guiding members and, at the same time, the corresponding notch opposite the associated guiding member, and movement in the opposite direction bringing the second notch opposite a guiding member and thereby permitting a stop moving in the last-mentioned direction to cam said pick-up bar to depressed position.

35. In a computing machine, the combination with a traveling carriage and tabulating mechanism including tabulator-keys, of transposition mechanism comprising a movable cam member, carriage-controlled means for moving said cam member in a direction opposite to that of the carriage movement, and tabulator-key-actuated mechanism for rendering said transposition mechanism ineffective.

36. In a computing machine, the combination with a traveling carriage and tabulating mechanism including tabulator-keys, of denominational members carrying index-devices, numeral keys, numeral-key-actuated devices for setting said index-devices, transposition mechanism including a movable cam, carriage-controlled means for moving said cam in a direction opposite to that of the carriage movement, and tabulator-key-actuated mechanism for rendering said transposition mechanism ineffective and locking said numeral keys.

37. In a combined typewriting and computing machine, the combination with a traveling carriage, typewriter keys including numeral keys, and case-shift mechanism, of denominational members carrying index-devices, numeral key-actuated devices for setting said index-devices, transposition mechanism including a movable cam, carriage-controlled means for moving said cam in a direction opposite to that of the carriage movement, and case-shift-actuated mechanism for rendering said transposition mechanism ineffective.

38. In a computing machine, the combination with a traveling carriage and numeral keys, of computing mechanism controlled by said numeral keys and said carriage comprising a series of reciprocable bars, a cam, means for supporting said cam so as to permit successive engagement of said bars thereby, said supporting means comprising a bar on which said cam is slidably supported, numeral-key-locking means, a pivoted lever, and connections whereby a movement of said lever from normal position will effect movement of said cam-supporting bar to inoperative position and render said key-locking means effective, and further movement will maintain said cam-supporting bar in inoperative position and permit said key-locking means to become ineffective.

39. In a computing machine, the combination with a plurality of movable members carrying sets of index-devices and numeral-key-actuated mechanisms for setting said index-devices, said sets of index-devices being normally out of position to be operated by said setting mechanisms, of denomination-selecting means, including a traveling dog, for positioning said movable members in succession to bring said sets of index-devices into position to be operated by said setting mechanisms, a bar on which said dog is mounted for sliding movement, means to effect a traveling movement of said dog along said bar, and means for shifting the position of said bar to render said dog ineffective.

40. In a computing machine, the combination of a plurality of sets of index-devices and numeral-key-actuated mechanism for setting said index-devices, said sets of index-devices being normally out of position to be operated by said setting mechanism, denomination-selecting means including a series of movable members having operative connections with said sets of index-devices to enable operative positioning of the same with reference to said setting mechanism, a selecting dog, a bar on which said dog is supported, means to move said dog along said bar to effect successive actuation of said movable members by said dog, and means to shift said bar to prevent actuation of said movable members by said dog.

41. In a combined typewriting and computing machine, the combination with a traveling carriage, a plurality of sets of index-devices and numeral-key-actuated setting means for said index-devices, said sets of index-devices and said setting means being normally in ineffective relation with respect to each other, of means for bringing said sets of index-devices and said setting means into effective relation including a series of denominational members, a selecting dog having a cam face, a bar on which said dog is mounted, carriage-actuated means to move said selecting dog across said denominational members, in a direction opposite to that of the carriage, to actuate the same, and means to effect a relative movement of said dog and said denominational members to prevent engagement of said members by said dog.

42. In a computing machine, the combination with a plurality of sets of index-devices and numeral-key-actuated setting means for said sets of index-devices, said sets of index-devices and said setting means being normally in ineffective relation with respect to each other, of means for bringing said sets of index-devices and said setting means into effective relation, including a series of denominational plungers, a selecting dog, a bar on which said dog is mounted, means to move said selecting dog across said denominational plungers to engage the same in succession, the engaging surfaces of said denominational plungers and said selecting dog being such that engagement of said dog with said denominational plungers will effect a movement of the latter by a camming action, and means to effect a relative movement of said dog and said denominational plungers to render the former ineffective with respect to the latter.

43. In a computing machine, the combination with a traveling carriage, of numeral keys, a plurality of sets of driving bars, each of which carries a set of index-devices, numeral-key-actuated devices for setting said index-devices, denomination-selecting means including a selecting dog for each set of driving bars, a bar on which said selecting dogs are slidably mounted, means including a pick-up bar for actuating each of said dogs a stop-bar connected to said carriage to move therewith, and stops of varying configuration on said bar whereby any pick-up bar may be engaged by a suitable stop positioned at any point on said stop-bar.

44. In a computing machine, the combination with a plurality of registers and operating means for each of said registers including a plurality of sets of index-devices corresponding to the capacity of the register, of means for setting said index-devices, said index-devices and said setting means being normally out of operative relation, means to bring said sets of index-devices successively into operative relation with said setting means comprising denominational members associated with said sets of index-devices respectively, means including a selecting dog for each register to effect a camming action on said denominational members, a traveling carriage, a stop thereon, and means operated by said stop to actuate all of the selecting dogs.

45. In a combined typewriting and computing machine, the combination with keys including numeral keys, of preliminary representation devices including a series of movable members, a cam, a bar transverse to said movable members on which said cam is slidably mounted, means to effect a traveling movement of said cam along said bar, supporting means for said bar permitting movement thereof to and from a position to make said cam effective with respect to said movable members, a cam-follower connected to said bar, and a pivoted member having cam means thereon adapted to coöperate with said cam follower and thereby control the position of said bar, 46. In a combined typewriting and computing machine, the combination with keys including numeral keys, of preliminary representation devices including a series of denominational members, a cam-dog, a cam-dog-supporting bar extending across said denominational members, means for moving said cam-dog along said bar to engage said denominational members *seriatim*, a bar-carrying frame mounted for movement to and from a position to make said cam-dog effective, a follower on said bar-carrying frame, and a cam-member adapted to engage said follower and thereby control the position of said bar.

47. In a computing machine, the combination with a plurality of registers and operating means for each of said registers including a plurality of sets of index-devices corresponding to the capacity of the register, of means for setting said index-devices said index-devices and said setting means being normally out of operative relation, means to bring said sets of index-devices successively into operative relation with said setting means comprising denominational members associated with said sets of index-devices respectively, means, including a selecting dog for each register, to effect a camming action on said denominational members, a traveling carriage, stops of different configuration connected to move with said carriage, and actuating means for each of said selecting dogs, whereby a stop of suitable configuration will effect simultaneous operation of the selecting dogs desired.

48. In a combined typewriting and computing machine, the combination with keys including numeral keys and means for effecting computation, of preliminary representation devices to index the number to be computed comprising a series of denominational members, a bar secured on pivoted arms and extending across said series of denominational members, and a dog mounted for sliding movement along said bar, a numeral-key-locking device including a member through which it may be controlled and means to determine the position of said bar and the effectiveness of said numeral-key-locking device, including a follower connected with one of said arms, and a pivoted lever provided with a cam-slot for coöperation with said follower, and a cam-surface for engagement with said controlling member.

49. In a combined typewriting and computing machine, the combination with keys including numeral keys, of denominational members, a selecting dog, a swinging frame comprising pivoted arms and a bar on which said dog is mounted, a cam-follower on said swinging frame, numeral-key-locking means including a controlling member, a pivoted member having a cam-slot for coöperation with said follower, and a cam for engagement with said controlling member, said cam having two ineffective portions and an intermediate portion for effecting operation of said locking means.

50. In a combined typewriting and computing machine, the combination with keys including numeral keys, of preliminary representation devices including a series of denominational members, means, including a selecting dog, to effect a camming action on said denominational members, means for moving said selecting dog across said denominational members to cause actuation of the same seriatim, a frame on which said selecting dog is slidably supported for movement, a cam-follower on said frame, a numeral-key-locking device, and movable member having cam-means to coöperate with said follower to control the position of said frame to render said selecting dog effective or ineffective, and having additional cam-means for rendering said locking device effective or for releasing the same.

51. In a computing machine, the combination with a series of denominational members and numeral keys, of a selecting dog, a bar on which said dog is mounted, means to move said dog along said bar to engage said denominational members seriatim, pivoted arms on which said bar is supported, a cam-follower connected with said arms, numeral-key-locking means including a controlling member, a lever having a limited movement, said lever having a cam-slot engaging said follower, and a cam-surface for engagement with said controlling member, said cam-surface having a releasing portion at each end and a locking portion at the center.

52. In a combined typewriting and computing machine, the combination with a series of denominational members and a punctuation-lock including controlling members positioned between said denominational members, of a selector-dog, a guide on which said dog is slidably mounted, means to effect a traveling movement of said dog along said guide for engagement seriatim with said denominational members and controlling members, and means actuated by a controlling arm for moving said guide to render said dog ineffective and for actuating said lock.

53. In a combined typewriting and computing machine, the combination with a series of denominational members and a punctuation-lock comprising controlling members arranged between said denominational members in accordance with the punctuation required, of a selector-dog, a guide on which said dog is slidably mounted, means to effect a traveling movement of said dog along said guide, and settable means effective for one setting to position said guide to render said selector-dog ineffective and retain said lock in locking position, and effective for another setting to position said guide to render the selector-dog ineffective and to release said lock.

54. In a combined typewriting and computing machine, the combination with a series of denominational members and a punctuation-lock including controlling members positioned between said denominational members, of a selector-dog, a guide on which said dog is slidably mounted, means to move said dog along said guide to engage said said dog along said guide and said controlling denominational members and said controlling members seriatim, and controlling means for said guide and said lock including an arm which, during movement from one limiting position to the other, will act to shift said guide to render said dog ineffective and to lock and unlock said punctuation-lock.

55. In a computing machine, the combination with a series of denominational members, of a selector-dog, a guide on which said dog is slidably mounted, means to effect movement of said dog along said guide for engagement seriatim with said denominational members, and means to position said guide to render said dog ineffective with respect to said denominational members.

56. In a computing machine, the combination with a series of denominational members, of a selector-dog, a guide on which said dog is slidably mounted, means to effect movement of said dog along said guide for engagement *seriatim* with said denominational members, and means to rock said guide to render said dog ineffective with respect to said denominational members.

57. In a combined typewriting and computing machine, the combination with a paper-carriage and feeding means to give a step-by-step letter-space movement to said carriage, of computing mechanism including index-devices, numeral-key-actuated means for setting said index-devices, denomination-selecting means including a series of denominational members, a selector-dog, having a cam-face, mounted for movement to cause said cam-face to engage said members *seriatim*, said denominational members being spaced at more than letter-space distances apart, and carriage-actuated means whereby, for a letter-space movement of said carriage, said dog will receive a movement equal to the interval between successive denominational members, whereby an opportunity is afforded to vary the inclination of the cam-face and to provide a suitable dwell portion.

58. In a combined typewriting and computing machine, the combination with a paper-carriage and feeding means to give a step-by-step letter-space movement thereto, of computing mechanism including a series of denomination-selecting members, a selector-dog, having a cam-face, mounted for movement transversely of said selecting members for *seriatim* engagement therewith, and carriage-actuated means to drive said dog, comprising a lever to one end of which the carriage actuation is applied, and a link connected to the other arm of said lever.

59. In a combined typewriting and computing machine, the combination with a traveling carriage, of a plurality of series of denominational members, selector-dogs, one for each of said series, a guide on which said dogs are slidably mounted for *seriatim* engagement with the denominational members of the corresponding series, pivoted levers, one for each of said dogs and having driving connections therewith, a stop connected to said carriage to travel therewith and having a predetermined configuration to determine the selector-dogs to be actuated, pick-up devices, one for each lever, whereby, upon reaching a certain point in its travel, said stop will engage simultaneously certain of said devices, in accordance with its configuration and thereby actuate the corresponding dogs, and means to release said pick-up devices after said dogs have passed the members of lowest denomination.

60. In a combined typewriting and computing machine, the combination with a traveling carriage, of a plurality of series of denominational members, selector-dogs, one for each of said series, a guide on which said dogs are slidably mounted for engagement *seriatim* with the denominational members of the corresponding series, pivoted levers, one for each of said dogs and having a driving connection therewith, a stop connected with said carriage to travel therewith and having a predetermined configuration to determine the number of selector-dogs to be actuated, and devices actuated by said stop to operate simultaneously the levers and the respective dogs determined by the configuration of said stop and to release said levers and consequently said selector-dogs upon completion of the denomination-selecting action.

61. In a computing machine, the combination with a plurality of registers, a traveling carriage and a series of stops on said carriage, having different configurations to determine the number of said registers to be rendered effective simultaneously by each of said stops, of a plurality of sets of denominational members, one set for each register, a selector-dog for each of said sets, a guide, fixed against longitudinal movement, on which said selector-dogs are slidably mounted for movement, on which said selector-dogs are slidably mounted for movement to engage *seriatim* the denominational members of the corresponding sets, actuating levers on a common pivot, connections, including a link of suitable length, between each of said levers and the corresponding selector-dog, a slide connected to each of said levers and supported for movement parallel to the path of said stops, means urging each of said levers to normal position, means whereby certain of said slides will be actuated by said stop after passing a certain point, and means actuated by said stop to break the connection between said stop and said slides actuated thereby.

62. In a combined typewriting and computing machine, the combination with a register, a traveling carriage and stops thereon at intervals less than those corresponding to the capacity of said register, of a plurality of denominational members in accordance with the capacity of the register, a traveling dog for engaging said members *seriatim* in descending order of denomination, means urging said dog to home position, driving means for said dog including a slide adapted to be engaged by a stop moving through a computing zone, and means to release said slide as the effective stop passes out of the computing zone and permit said slide to return under the influence of said urging means until engaged by the next succeeding stop.

63. In a combined typewriting and computing machine, the combination with a plurality of registers, of sets of denominational members, one for each of said registers, a selecting dog for each register, means to actuate each of said dogs to render the corresponding register effective, a traveling carriage, stops of different configurations thereon, and means whereby each of said stops in passing through a certain portion of its path will effect actuation of certain of said dogs in accordance with the configuration of the active stop, only one stop being effective at one time.

64. In a combined typewriting and computing machine, the combination with a plurality of registers, of actuating means therefor, including sets of denominational members, one for each register, index-devices movable by said members into position to be set, numeral-key-actuated devices for setting said index-devices, a selecting dog for each set of denominational members, mounted to travel along a path to engage the corresponding denominational members *seriatim*, means urging each of said dogs to a position adjacent to the member of highest denomination in the corresponding set, operating devices for said dogs, each having an engaging element, such engaging elements being normally in alinement from front to rear, a traveling carriage, and stops mounted thereon, said stops being of different configurations to determine the dogs to be actuated by a single stop through engagement thereof with certain of said engaging elements.

65. In a combined typewriting and computing machine, the combination with a plurality of registers, of actuating means therefor, including sets of denominational members, one for each register, index-devices movable by said members into position to be set, numeral-key-actuated devices for setting said index-devices, a selecting dog for each set of denominational members, mounted to travel along a path to engage the corresponding denominational members *seriatim*, a traveling carriage, stops of suitable configurations thereon, and dog-actuating devices adapted to be operated only by a stop moving in a certain part of its path, the configuration of the effective stop determining the number of dogs to be actuated, and consequently the number of registers rendered effective.

66. In a combined typewriting and computing machine, the combination with a plurality of registers, of actuating means therefor including sets of denominational members, one for each register, index-devices on each of said members, numeral-key-actuated devices for setting said index-devices, a general operator, denomination-selecting means, including a selector-dog for each register, and means for operating any of said registers as footing registers and the remainder as cross-adding registers for any number of columns, including a traveling carriage, stops of suitable configurations thereon, and dog-actuating devices adapted to have simultaneous actuation in any selected group in accordance with the configuration of the effective stop.

67. In a computing machine, the combination with a traveling carriage and a computing unit, comprising a series of denominational members and sets of index-devices movable thereby into position for setting, of means for setting said index-devices when positioned for setting, a general operator for effecting computations in accordance with the setting of said index-devices, and denomination-selecting mechanisms for said denominational members, comprising a selector-dog mounted for movement to engage the corresponding denominational members *seriatim* and adapted to actuate said members, upon engagement therewith, to move said sets of index-devices into operative position with respect to said setting means, and means, including a stop mounted to move with said carriage, for driving said dog across said series of denominational members and releasing it upon completion of such movement.

68. In a computing machine, the combination with a traveling carriage, of a plurality of movable members carrying computing devices, key-driven mechanism for operating said computing devices, the normal position of each of said movable members being such as to prevent operation of the computing devices thereon by said key-driven mechanism, and means to shift said movable members *seriatim* to bring the computing devices thereon into operative relation with respect to said key-driven mechanism, comprising a series of elements engaging said members, a dog, and carriage-driven means to move said dog transversely of said elements in a direction reverse to that of the carriage to effect successive camming engagement therewith.

69. In a computing machine, the combination of a traveling carriage and a series of movable members, of a cam, a transverse guide on which said cam is slidably mounted, carriage-actuated means for moving said cam along said guide, mechanism normally holding said guide in position to enable said cam to engage said movable members and actuate the same, and means to actuate said mechanism to withdraw said guide from said movable members to prevent engagement of the cam therewith.

70. In a computing machine, the combination with a plurality of members having index devices thereon, a plurality of elements to engage said members and means for setting said index devices, of means for severally positioning said members to enable setting of said index devices by said setting means, comprising a guide extending transversely of the machine, a dog slidably mounted on said guide for traveling movement therealong, means whereby engagement of said elements by said dog will effect operative positioning of said members with reference to said setting means, and means to move said guide so as to prevent engagement between said elements and said traveling dog.

71. In a computing machine, the combination with a traveling carriage and numeral-keys, of computing mechanism controlled by said numeral-keys and said carriage comprising a series of movable members, a cam, means for supporting said cam so as to permit successive engagement of said members thereby, said supporting means comprising a guide on which said cam is slidable, numeral-key-locking means, a controlling element, and connections whereby a movement of said controlling element from normal position will effect movement of said guide to inoperative position with said cam in retracted position and render said key-locking means effective, and further movement will maintain said guide in inoperative position and permit said key-locking means to become ineffective.

LESTER A. WERNERY.

Witnesses:
JENNIE P. THORNE,
EDITH B. LIBBEY.